United States Patent [19]

Eilentropp

[11] Patent Number: 4,523,086
[45] Date of Patent: Jun. 11, 1985

[54] FLEXIBLE ELECTRICAL THERMAL ELEMENT

[75] Inventor: Heinz Eilentropp, Wipperfürth, Fed. Rep. of Germany

[73] Assignee: HEW Kabel, Heinz Eilentropp KG, Wipperfuerth, Fed. Rep. of Germany

[21] Appl. No.: 531,631

[22] Filed: Sep. 13, 1983

[30] Foreign Application Priority Data

Sep. 13, 1982 [DE] Fed. Rep. of Germany ....... 3233904
Sep. 13, 1982 [DE] Fed. Rep. of Germany ....... 3233928
Nov. 22, 1982 [DE] Fed. Rep. of Germany ....... 3243061

[51] Int. Cl.³ ............................................... H05B 3/56
[52] U.S. Cl. .................................... 219/549; 219/528; 219/541; 219/545; 219/552; 338/214
[58] Field of Search ............... 219/211, 212, 464, 527, 219/528, 529, 541, 544, 549, 552, 553; 338/214; 339/97 C; 138/149, 33, 111; 156/136; 29/611

[56] References Cited

U.S. PATENT DOCUMENTS

| 1,442,648 | 1/1923 | Carter | 338/214 |
|---|---|---|---|
| 2,453,313 | 11/1948 | Gordon | 338/214 X |
| 2,494,589 | 1/1950 | Sletner | 338/214 X |
| 2,758,294 | 8/1956 | Duncan | 338/214 X |
| 2,862,097 | 11/1958 | Negromonti | 219/545 X |
| 3,349,359 | 10/1967 | Morey | 219/545 X |
| 3,478,422 | 11/1969 | Inui | 29/611 |
| 3,513,297 | 5/1970 | Jordan | 219/545 |
| 3,757,086 | 9/1973 | Indoe | 219/528 |
| 4,037,083 | 7/1977 | Leavines | 219/552 |
| 4,194,536 | 3/1980 | Stine et al. | 138/149 |
| 4,250,400 | 2/1981 | Lee | 219/549 |
| 4,309,597 | 1/1982 | Crowley | 219/549 |

FOREIGN PATENT DOCUMENTS

| 116448 | 10/1946 | Sweden | 338/214 |
| 2098438 | 11/1982 | United Kingdom | 338/214 |

Primary Examiner—Volodymyr Y. Mayewsky
Attorney, Agent, or Firm—Ralf H. Siegemund

[57] ABSTRACT

A flexible heating element is suggested to be made on a continuous basis, so that desired length can be cut therefrom and includes individual, electrically insulated feeder lines and a heating being interlooped in interweaving fashion with the feeder lines, there being discrete locations of the feeder lines from which the insulation has been removed for making contact with the heating conductor for supplying power thereto.

9 Claims, 7 Drawing Figures

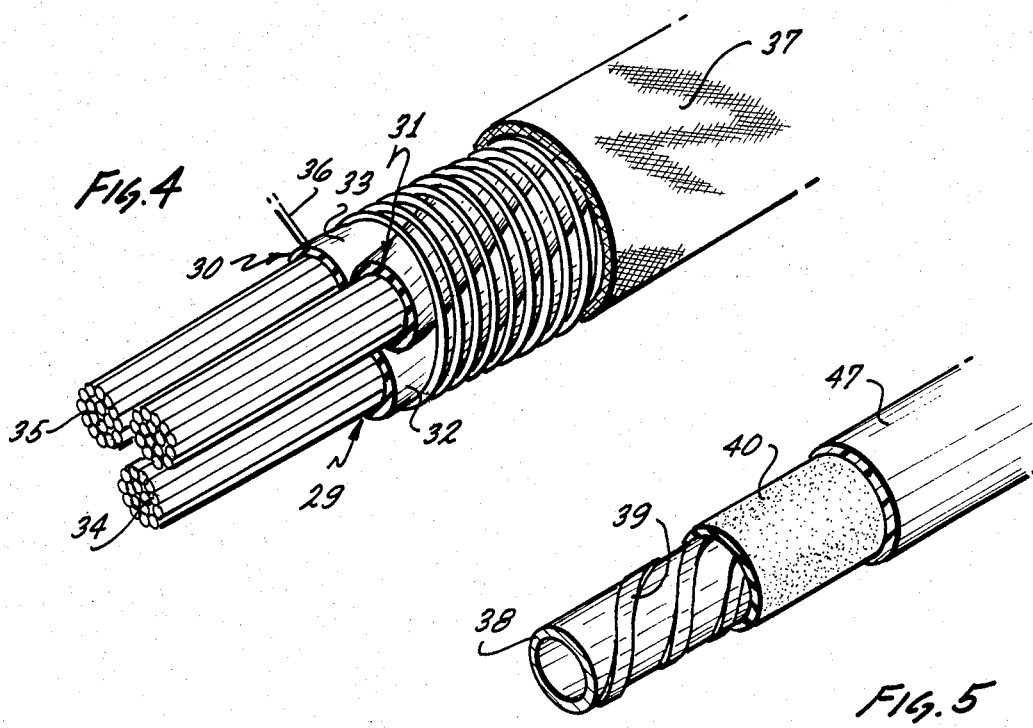
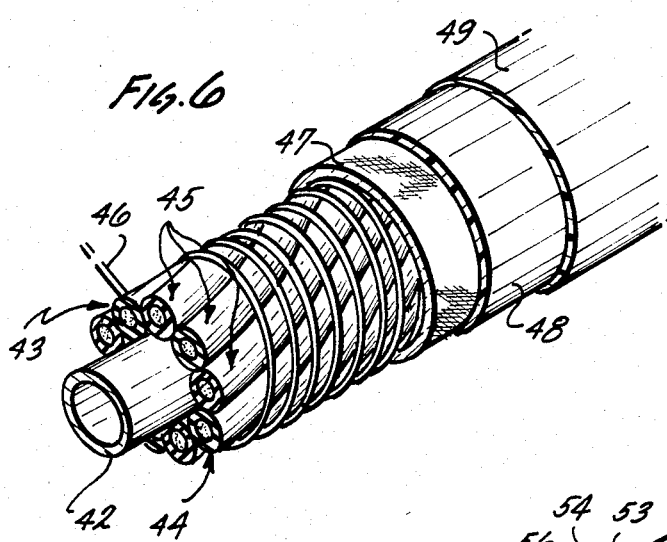
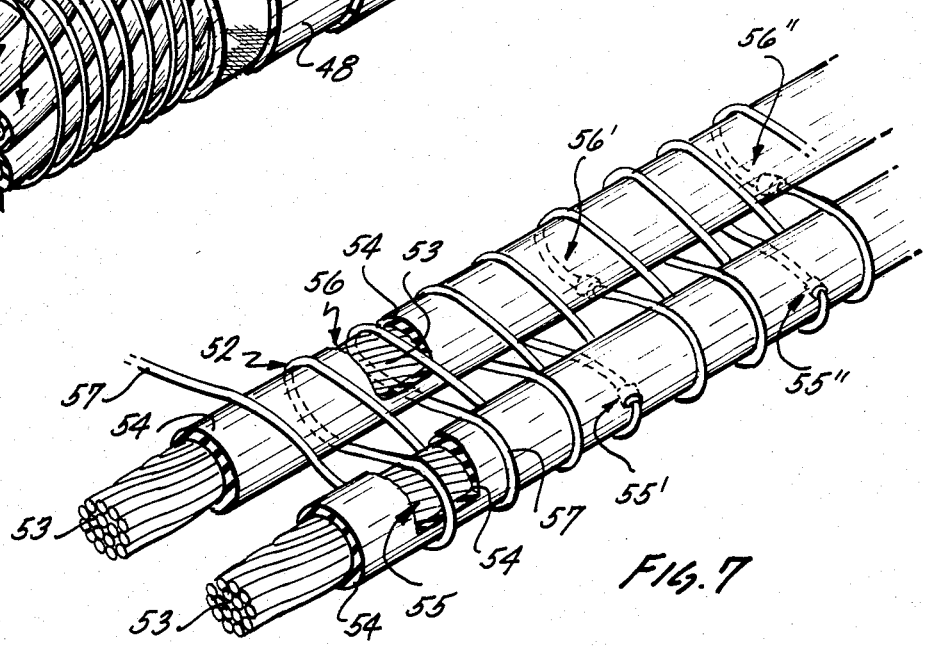

FLEXIBLE ELECTRICAL THERMAL ELEMENT

BACKGROUND OF THE INVENTION

The present invention relates to a flexible electrical heating or temperature measuring element made of electrically insulated conductive lines for feeding power to one or more heating or measuring conductors, as the case may be, and more particularly the invention relates to elements of the type above wherein the power feeding conductors intermittently connected to the heating or measuring conductor, along the length of the element and wherein zones are defined in between sequential connection points for purposes of applying or sensing heat.

Flexible heating elements of the type to which the invention pertains are known, for example, under the trade name "Econotrace". These elements provide for heating along their extension and include feeder conductors made of copper with an insulation of polytetrafluoroethylene-perfluoropropylene (FEP). The same insulation is provided around both of the feeder conductors constituting the so-called internal insulation, and the heating conductor proper is round on top thereof. This heating conductor is comprised, for example, of a chromium-nickel alloy. The aforementioned internal insulation as well as the jacket on the individual feeder conductors or lines is removed along the outer edges and in certain spaced apart locations so that the adjacent heating conductor is electrically connected with the conductors of the feeder line in these locations. This arrangement is basically satisfactory. However, it was found that due to the required flexibility of the cable or element as a whole, it may occur that the loops of the heating conductors shift and particularly, they may shift away from the location where the insulation had been removed from the feeder conductors. Therefore, satisfactory and consistent electrical contact is not guaranteed. The same problem has been observed if upon heating the various elements and materials expand, thereby for example, loosening the loops of the heating conductor from one or the other locations.

The aforementioned system as well as the so-called self-regulating heating strip as disclosed, for example, in U.S. Pat. No. 4,194,536, are disadvantaged further by the fact that for monitoring or control of the heating current one needs additional cable or conductors. Even more important, however, is the fact that the power consumption and dissipation in the known heating element, including those of the self-regulating variety, is subject to limitations. This means that, for example, the heating or other thermal control, for example, of large tubes conducting fluid which has to be kept at a certain temperature during conduction requires a large amount of individual heating elements each being provided with connection pieces and feed points. It has to be considered here that particularly in the field of so-called tube bundle cables heating, or other temperature controls, requires frequently that branches in the conduit system have to be accommodated, particularly they have to be likewise heated or temperature controlled. This requires additional feed points for heating and there may be a problem with regard to mounting and connecting space, particularly in the branch point. In this regard it has to be considered that the connection branches and other joints usually require particular protection against ingress of moisture, and sometimes even explosion proofing is required.

The same is essentially true with regard to a different kind of known heating cable traded under the designation "W082/01112" wherein the heating conductor runs in between the parallelly arranged feeding lines. The electrically conductive connection between the feeder lines and the heating conductor is provided intermittently under utilization of clamping type contact elements. The heating conductor may be comprised, in this case, of a helix that is round on top of a core and it is a core which extends in parallel to the feeder lines.

DESCRIPTION OF THE INVENTION

In accordance with the preferred embodiment of the present invention, it is an object thereof to provide a new and improved flexible, electrical heating conductor which optimizes thermal distribution even in the specific instances mentioned above while being highly reliable. More particularly, it is an object of the present invention to provide a flexible electrical heating element in which optimum thermal distribution is to be interpreted as a optimization of heating or temperature acquisition, particularly in those cases in which the flexible electrical element is not, per se, used for heating but for purposes of measuring temperature under comparable mechanical construction and at a high degree of reliability. In this regard it must be understood that heating and temperature sensing are quite equivalent in terms of relevant structure; only the direction of heat flow differes, but the requirement of uniformity in the heat flow is the same and entails similar structural requirements.

In accordance with the preferred embodiment of the present invention, it is suggested to weave or plait the heating or measuring conductor into, around and/or over the feeding conductors of the system whereby particularly the heating conductors individually surround the feeder conductors under formation of loops or are provided in a helical fashion on stranded feeder conductors. It is decisive, that the heating or measuring wire crosses the feeder line, essentially transverse in multiple points, not being in the same plane. These features insure the desired position of the heating conductors and prevent longitudinal shifting of any loops, particularly away from the respective zones of contact with the feeder conductors. It is important to realize that the same rules are applicable for using the arrangement with a heating conductor in the form of a wire, as well as for a heating element which is wound upon a carrier. Also, the heating conductor may be replaced by a temperature sensing conductor or thermoelement system. Another advantage of the invention is to be seen in that in the interweaving and plaiting as well as the formation of loops, one can accommodate a higher electrical resistance per unit length. Accordingly, individual heating elements can be cut off a continuous string of the type constructed in accordance with the invention which cutoff string portion is relatively short and still exhibits sufficiently high resistance for purposes of heating.

Exactly the same advantages flow from the situation in which the principle of the invention is used for a temperature measuring system, for example for temperature monitoring of electrical cable, tubes, tube systems or the like. Herein, an interplaited or interwoven resistance wire is used in conjunction with feeder conductors whereby through a local increase in temperature the resistance of this wire changes, and this change is, for example, ascertained through a measuring bridge. The interwoven or interplaited measuring conductors may, for example, consist of thermo-elements which provide directly an electrical signal in the case of a temperature change within the system to be monitored, the signals being extracted through the otherwise voltage-free feeder conductors.

In either case, one has available, for example, a ribbon constructed in accordance with the invention having many heating or measuring zones or local thermo-elements, the number being basically arbitrary and is determined by the purpose for the system and is specifically determined by the chosen length. In accordance with one aspect of the invention one may, for example, loop the heating conductor around a stranded system of feeder conductors and the resulting element can be wound around a tube with relatively low or small pitch. U.S. Pat. No. 3,555,572 shows heating conductors per se arranged on a tube, however. Proceeding along the lines as per the invention along the heating distribution over the surface of the tube is significantly improved over these or similar arrangements employing known heating elements. In the case of stranding or other forms of bundling, one does not incur the danger that the contact making condition between heating conductor or measuring conductor and the feeder conductors is interfered with or even interrupted after the assembly has been wound upon a tube. The same advantage, except from an opposite point of view, results if one uses a flexible element constructed in accordance with the principle of the present invention for measuring the temperature of an electrical cable, a tube or a tube system.

In furtherance of the invention, the heating or temperature measuring element of the system includes at least one additional or supplemental conductor for enlarging the field of use of the assembly. It is quite unimportant whether the heating elements are flat or stranded or otherwise round and bundled. Decisive is that the heating system may integrate a plurality of signalling, controlling and/or monitoring functions which generally enhances reliability. The plaited or interwoven kind of integration, in turn, avoids separate conducting systems for a separation of these functions. Another advantage is to be seen from the fact that for similar constructions, or particular circuit designs at the point of installation, and here particularly at the end of the respective heating elements, one may still provide for an increase in power such as is obtainable generally through connection of one or more additional systems in parallel. These additional conductors or systems may, in furtherance of the invention, merely run along a particular heating element and are used only for a second length of such heating element is to be connected downstream to the first one, or in the case of a branch the respective line is to be supplied separately with current for its heating conductor. In either case, such supplemental conductor does not participate in feeding the heating elements of the first length of the heating element but is only used as feeder line for a second length or a branch line. This way one reduces the number of local feed points which enhances the reliability of the whole system to a considerable extent.

As mentioned, supplemental conductors may run in parallel to those feeder lines which are provided with contact making points. For the same length of such a heating element the effective cross section of electrical conduction is increased which means an overall increase in heating power. A particular advantage is to be seen in the fact that this power increase may be provided for later, namely when in fact some additional connection is made at the end of the particular heating element so that the system which has already been installed does not require supplemental installation work. If a power increase is not required such then supplemental conductors or lines can be used otherwise, for example, for monitoring purposes and they are connected into a signalling circuit accordingly.

The supplemental conductor, conductors or lines can, in the alternative, be used for conducting from time-to-time supervisory or monitory measurements in the installed system. For this purpose, one may switch off those supplemental conductors which have already been dedicated to a power increase, and one uses them temporarily under a reduced load, just for purposes of providing for these measurements. Subsequently, their initial use as power increasing, supplemental conductors is restored.

It should be mentioned that the known heating conductors including the so-called self-regulated constructions do not permit employment under all of these variations obtainable under utilization of the invention. Moreover, it should be mentioned that at least one additional conductor may be provided in the heating element having a larger heating wire length. This is particularly true if in a furtherance of the invention the feeder conductors and the supplemental conductors are arranged in a common plane, one next to the other, and the heating conductor helically loops around all of them or the heating conductor is interplaited or interwoven in the multiple-conductor arrangement and forms multiple loops. This feature particularly permits relatively long heating conductor lengths for relatively short heating element lengths.

In furtherance of the invention it is suggested to include in the woven or plaited arrangement insulating threads, yarn or other fibers in order to ensure better coherence in the assembly and since they are physically combined with the heating conductor they protect the heating conductor against mechanical forces acting from the outside while establishing a permeable cover through which heat can be extracted without damming.

The heating power can be increased in accordance with another advantageous construction in that the feeder lines and the supplemental conductors are arranged in a bundle or as a stranded assembly and the heating conductor helically loops around all these lines and conductors to establish heating zones arranged one behind the other (on the helix) and respectively between the points of contact with the feeder line, there being axially an uninterrupted zone of heating.

A further power increase is possible in one instance by running additional heating conductors along the assembly. Aside from a basically stretched configuration, one or the other heating conductor may have the contour of a helix independently from the helical looping of the heating conductor as a whole, or the heating conductor may be provided in a twined configuration, i.e. it is looped around a supporting electrically insulating core and that core plus conductor assembly is then combined with the feeding conductors and supplemental conductors as outlined above. This way one increases the effective heating length. Another advantageous manner of increasing the heating conductor lengths is to include it in a mesh type arrangement or to provide the heating conductor itself as mesh.

The heating ribbons, heating cable or the like which are known and available in selected lengths all have in common that the contact points between heating conductor and feeding conductor requires removal of the electrical insulation of the feeding conductors at the particular locations. This removal requires, for example, milling, scraping, cutting or the like. This additional working step has to be conducted prior to looping the heating conductor upon the otherwise completely insulated and possibly jacketed feeder conductors. Therefore, only outwardly disposed zones of the insulation are available for such removal. This means that the contact areas are relatively small and these ranges as far as availability for contact making is concerned constitute weak points in the known heating conductors. This subsequent or in situ baring of the conductors of the feeder lines is apparently another reason for the fact that only ribbon-shaped heating elements are, in fact, known in the trade and they seem to have been exclusively used for serving as selective length units. Moreover, the contact-making and clamping elements used in the known heating cables with parallel feeder lines and heating conductors are usable only if, in fact, the assembly if flat. Moreover, additional interference is to be expected, for example, through defective clamping of individual elements.

In furtherance of the invention, these drawbacks are avoided by removing in advance the insulation in a complete annular zone from the feeding conductor or conductors at the point of contact. Moreover, this removal of the insulation is carried out already when the feeder line is being made as a separate item so that any subsequent removal of insulation is avoided as a separate working step; particularly it is avoided to remove insulation when the heating element has already been assembled. Moreover, an annularly, i.e. peripherally closed groove baring the conductor surface is now available for each contact point along a feeder line which feature ensures positive contact making therewith. This is true in cases in which the conductors are run next to each other in the form of a ribbon as well as in those cases wherein the feeder lines are stranded or bundled together with supplemental conductors.

It is also known that relatively high temperature resistive material is needed for electrically insulating the feeder conductors to be included in feeder cables or lines. Materials that are available here are, for example, elastomeric compounds, for example, rubber on a silicon rubber (coutchone) basis. Another advantageous material is fluoropolymer, such as polytetrafluoroethylene or one of the copolymers thereof which have thermoplastic properties and are known, for example, under the designation "FEP", "PFA" or "ETFE". By way of example, FEP is a copolymer of tetrafluoroethylene and parafluoropropylene which can stand a long term temperature of up to 205° C. An example for PFA is perfluoroalcoxy which can stand a temperature up to 260° C., this corresponds to the temperature range of polytetrafluoroethylene (PTFE). The above mentioned material called ETFE is also known under the trade designation "Tefzel" and is a modified copolymer of ethylene and tetrafluoroethylene with a ratio of 25% to 75% and a rated temperature for normal use up to 155° C. These materials can be used in combination with electrically insulating thread or glass fibers or in combination with meshes or woven ribbons or the like which are assembled as separate layers. These materials may also be used in conjunction with reinforcing threads and glass fibers or the like in order to increase strength and ease of use. The aforementioned material FEP, PFA, or other, similarly suitable material may be extruded upon the conductor or conductor system of the heating element in ribbon or cable configuration. Alternatively, these materials can be wound as ribbons around the conductor assembly or assemblies.

It should be mentioned that it is known to use fluoropolymers which cannot be worked in molten form, such as polytetrafluoroethylene for purposes of electrically insulating conductors. However, the working of these materials is difficult so that the overall product length to which such materials can be applied is limited. Therefore, long tubes, pipelines or the like cannot be heated by means of electrical conductors which are electrically insulated in the known fashion by means of these high temperature resistive materials. On the other hand, these difficulties are avoided upon using heating bands, ribbons, or cable in accordance with the invention whereby particularly the electrical insulation of the feeder conductor is provided either with an intermediate layer or an outer coating of ribbon material which originally is not sintered but wound upon the feeder conductors and sintered in situ. Therefore, feeder lines can be electrically insulated for operation under high and highest thermoload; whereby, particularly powder pressing and sintering (in distinction to forming processes) of these high temperature resistive materials prior to application, much higher manufacturing speeds as permitted for obtaining indefinite length of the products.

The so-called self-regulating heating ribbons, particularly for heating tubes and pipes exhibit the property of self-limiting the effective thermal energy. This is particularly due to the known synthetic material used for insulation. Thus, these devices do not require the usual temperature limiting supplements. An analogous effect can be obtained in the case of heating ribbons constructed in accordance with the invention in that the heating conductors themselves are metals with a high temperature coefficient. In this regard, pure nickel was found to be advantageous.

As has been mentioned repeatedly, the heating element in accordance with the invention can be constructed as a ribbon or as a bundle. In either configuration, they are usable for heating tubes in order to maintain a particular temperature of the conducted fluid. The ribbon or bundles are helically wound around such a tube or tube system or run parallel to the axis thereof. A particularly advantageous configuration is obtained in furtherance of the invention in that the feeder lines and any supplemental conductor or conductors are stranded or bundled around a core element constructed as a tube or tube system for conducting the fluid or fluids. Such an employment of the invented heating element for purposes of heating the conducted fluid over the length of the conduction path ensures uniform temperature, particularly over the entire periphery of the tube without requiring any supplemental features. Moreover, the invention permits an advantageous practice as a result of the fact that the heating elements can be made in any length so that correspondingly any length of tube or tube systems can be made in the heated configuration. Heated tubes can be made of synthetic material or metal such as copper or high grade stainless steel which again can be made in continuous fashion and need to be cut to the desired length only at the installation sight. Providing heating conductors in a continuous length therefore ensures that shorter or longer tubes can be covered with heating elements in the stranded configuration over the entire periphery and without encountering any problems particularly with regard to uniform heating.

In the case of a tube system, for example a tube bundle, the possibility should be considered that such a bundle is established from a plurality of stranded single tubes. In this case, the feeder conductors and supplemental conductors as well as the heating conductor will surround this tube bundle in one or more lays. One may interpose one or more insulating layers in order to provide plural heating circuits for temperature control of the conducted fluid. Plural heating circuits may be accommodated and included in such a tube system in that the bundle as a whole is enclosed in a layer being comprised of feeder conductors, supplemental conductors and heating conductors and one or several individual tubes of the bundle are individually heated. These individual tubes may likewise be enclosed in a heating system of the type of the invention. These individual tubes as well as the heating elements associated with them may also be cut to any desired length so that one can see that a variety of tubes and tube system combinations can be established.

The same features apply if the tube or tube system is to be monitored with regard to the temperature of the conducted fluid. The temperature measuring elements, resistance conductor, thermal conductor, thermal elements or the like, are analogously placed around the circumference of the tube in order to determine very accurately the temperature of the transported medium so as to be able to recognise errors in the system as fast as possible, including particularly the localization of such errors.

In accordance with the invention, it is further feasible to provide both heating elements and temperature measuring elements both constructed in accordance with the present invention. Again, this feature is particularly applicable to tubes or tube systems. For example, a stranded or bundled set of individual tubes may include one of the tubes which is continuously heated over its length by means of an inventive heating element while the entire cable, i.e. all of the tubes in such a bundle or arrangement are enveloped in a temperature measuring element in accordance with the invention constituting one particular layer in a jacketing assembly.

It may be of advantage to mechanically secure the respective heating conductor or measuring conductor to the respective feed line at the points of electrical contact. For example, a melted dispersion of a metallized material may be provided at these locations. This technique is generally known by the term flame spraying. Alternatively, a suitable adhesive, for example on a ceramic basis, may be used for providing this supplemental mechanical connection at the point and area of electrical contact.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 4 is a similar type view of a cable-like heating element;

FIG. 5 illustrates in a perspective view the utilization of the heating element of FIG. 4 as a companion heater in a tube system;

FIG. 6 illustrates a tube heating system wherein heating element components are stranded onto a tube; and FIG. 7 illustrates a further modification of a ribbon type heating element.

Proceeding to the detailed description of the drawings, FIG. 1 illustrates a flexible electrical heating ribbon which can be made on a continuous basis and cut to any length. This cable includes the two feeder lines 1 and 2 having conductor cores 3 and 4, respectively and an electrical insulation 5. The insulating layer 5 may, for example, be made of silicon rubber, a fluoropolymer which has been extruded or FEP, PSA, or ETFE, mentioned above. Alternatively, the insulating layer may be comprised of a wrapped around ribbon, for example a PTFE ribbon, which has been sintered after having been placed upon the conductor.

Figure 1:
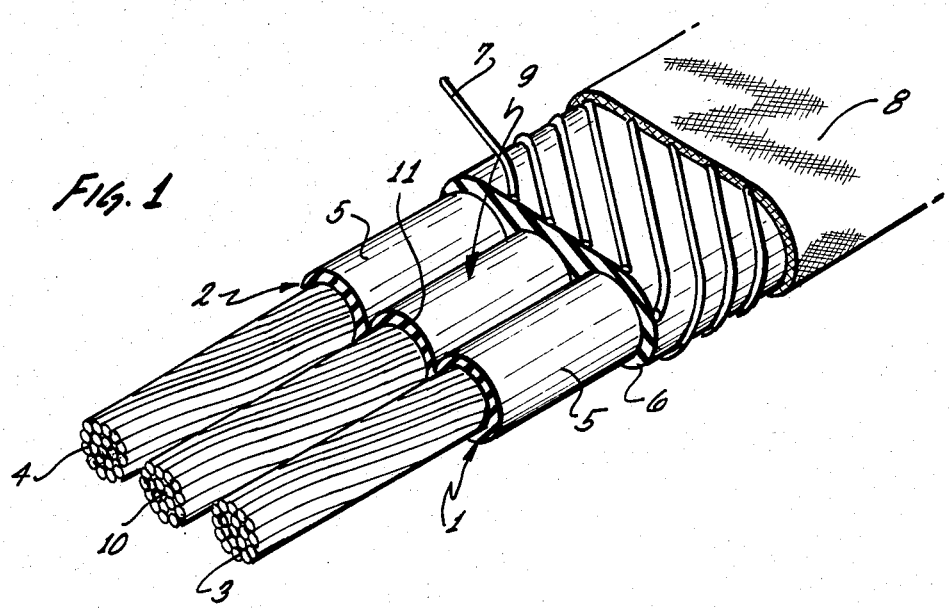
FIG. 1 is a perspective view of a ribbon like heating element wherein several layers have been peeled away for ease of illustration and viewing the element constituting an example for the preferred embodiment of the invention.

The entire assembly is held together by a wrapping 6 which, for example, is an extruded FEP or silicon rubber layer or again a PTFE ribbon wrapping. Still alternatively, a layer or coating made of yarn, thread or glass fiber mesh weaving or plait has been placed around the conductor. The heating conductor 7 itself is helically wrapped around the layer 6. The heating conductor is to make electrical contact with the conductors 3 and 4 in individual places. This is accomplished by removing the insulation 5 in the form of an annular groove for contact making of the conductors 3 and 4 with the heating wire. The layer 6, of course, is also removed about these respective spots and the heating conductor makes contact with the wire 3 and 4 over one or several loops. The heating wire crosses the feeder lines and the points of contact are not situated in the same plane. In fact, contact making forces act in plural directions, all tending to hold the assembly together.

The removal of the layer 6 can be avoided if one wraps the heating conductor 7, being a wire or a helix, or a stranded assembly with or without core, directly over the feeder lines 1 and 2 and to provide the layer 6, for example, a mesh or woven ribbon or the like on top of the heating conductor. In other words, the arrangement of the heating conductor 7 and of the layer 6 can be reversed. The assembly carries an outer layer 6, for example, made of a silicon rubber or any other suitable synthetic and has been extruded thereon or an appropriate ribbon has been wrapped around the assembly to establish the outer jacket 8. This jacket provides mechanical protection for the assembly. The jacket may be strengthened through the insertion of yarns, fibers or fiber meshes. Also, a flame of fireproof material may be of advantage and even required in cases.

Thus far only the feeder lines and heating conductor and the insulation has been described. The figure illustrates in addition a third line 9 with a conductor 10 and electrical insulation 11 interposed in between the two lines 1 and 2. This supplemental or auxiliary conductor 10 may be provided for the aforementioned tasks such as control or signal functions or as a feeder conductor which does not provide feed points to the particular heating conductor 7 but is used for feeding power to a heating element connected to the one illustrated to thereby improve the overall power output. It is conceivable that the conductors 3, 4 and 10 pertain to a three-phase system and only a respective two are used as feeder lines over any particular length.

Figure 2:
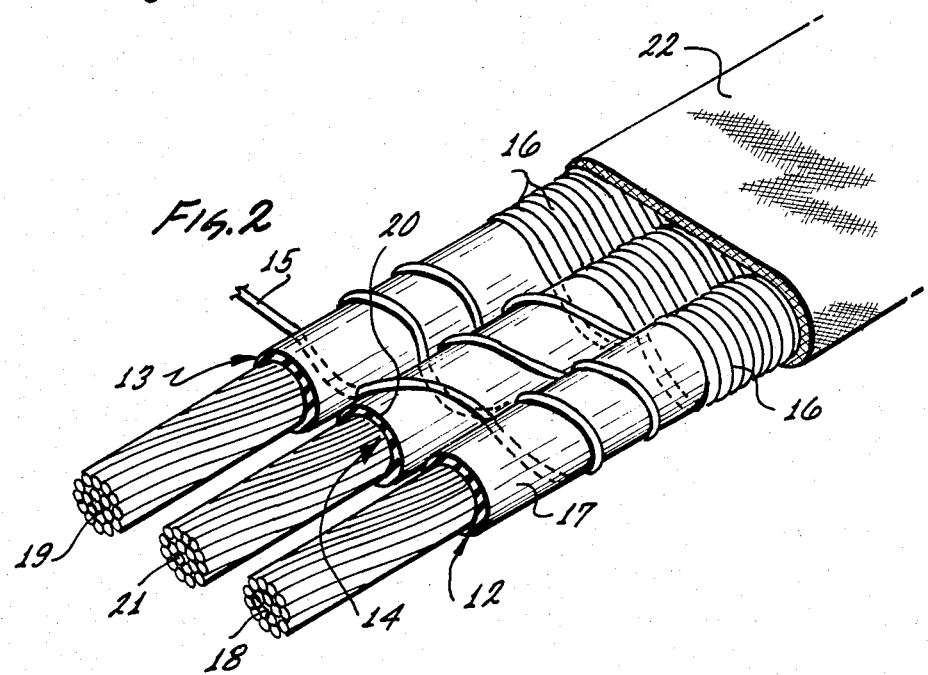
FIG. 2 is a similar view of a modified assembly for practicing the best mode of the invention.

The arrangement shown in FIG. 2 is a heating element or cable, also in ribbon configuration but differing from FIG. 1 in the manner in which the two feeder lines 12 and 13 are combined with a third feeder line. The heating conductor 15 may be a stretched wire made of a resisted alloy and is interwoven or interpleated by means of thread 15 so as to be physically combined in that fashion with the feeder lines. The points of contact are not illustrated but again, the insulation 17 of the respective conductors 18, 19 and 21 is removed in certain places so that the heating conductor 15 engages and makes contact with the conductors 18 and 19 over one or several loops. The threads 16 ensure the physical coherence of the assembly but they also protect the heating wires and thus serve also as axial spacers for the heating wire loops. The third line 14 may also serve as a supplemental feeder line for a three phase system and its insulation 20 is likewise locally removed so that the heating conductor 15 can make contact with the conductor 21. The entire assembly is jacketed by means of a cover 22 corresponding to the protective layer 8 in FIG. 1. Corresponding to known arrangements an additional line may be included and run parallel with the feeder lines and the heating conductors either as a supplemental line for performing auxiliary function or for purposes of operating the assembly in three phases so that additional places of context are to be provided for.

Figure 3:
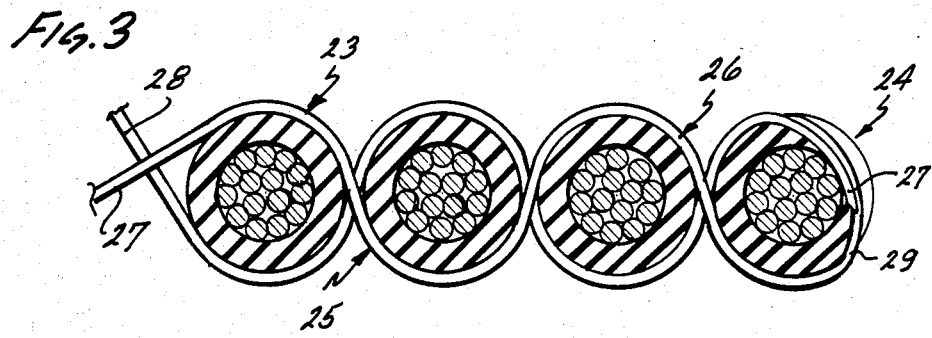
FIG. 3 is a section view of a ribbon assembly similar to FIGS. 1 and 2.

FIG. 3 illustrates an embodiment of the invention wherein in one plane, feeder lines 23 and 24 are provided supplemented by additional lines 25 and 26. Herein the line 25 may be a supplemental feeder line for a heating element which is connected to the one illustrated downstream and thus does not make contact with the heating conductor of the illustrated embodiment while line 26 may either having no immediate function or a spare function or can be used as a signalling control or monitoring line. Reference numeral 27 refers to the interwoven heating conductor and 28 is a thread, for example, made on the basis of glass which is likewise included in the meshed arrangement. The meshing or interweaving or plaiting of the heating conductor in the assembly of feeder lines in supplemental conductors establishes a configuration in which the heating wire is not just along the periphery of the assembly of feeder lines, etc. but also in the interior as far as the assembly as a whole is concerned and alternates in the looping configuration with respect to the other lines. This way one can establish a variety of configurations depending on the desired function.

Turning now to FIG. 4 there is illustrated a pair of feeder lines 29 and 30 as part of the flexible heating element that can be cut to desired lengths and being stranded together with another line 31. The insulation 32 and 33 respectively of the two feeder lines is annularly removed from the respective conductors 34 and 35 so that irrespective of twist the looped around heating conductors 36 will always make contact in one or more spots with feeder lines wherever needed. The outer jacket 37 is made, for example, by extrusion or ribbon wrapping under utilization of the materials mentioned above. The third line 31 may not be provided with locations in which the insulation has been removed and can be regarded as an electrical feeder line that runs in parallel to those lines which are in contact with the heating wire.

Again, this kind of heating element can be made in endless configuration and is characterized basically by a round cross section. This kind of a heating conductor is particularly suitable for wrapping around a tube at a relatively steep pitch so that the heat distribution with respect to the tube surface is considerably improved as compared with the known heating elements. A particular configuration is this regard is illustrated in FIG. 4 and here the particular situation is considered in which the feeder lines of the heating element as well as of the supplemental lines as well as the outer jacket are all made of polytetrafluoroethylene (PTFE) ribbon which is applied in each instance in an unsintered state and after the respective layers have been established through this kind of ribbon winding, the ribbons are sintered. The designation polytetrafluoroethylene includes those tetrafluoroethylene polymers which are provided with modifying additives but only in such quantities that the polymer proper, i.e. the polytetrafluoroethylene itself is still not workable in the melted state. Other suitable materials which can be used here are, for example, those on the basis of polyimides.

As was mentioned above, electrical heaters are used, for example, for a compliment kind of heating, i.e. for heating tubes over their entire length. This kind of fluid conduit is, for example, used in the chemical industry wherein the fluid has to be maintained at a particular temperature. The same is true for sampling or probing conduits. In particular, it is usually necessary in this case that the fluid being conducted is maintained at a constant temperature throughout its conductive path. This aspect of maintaining the temperature constant is often an absolute requirement because in some instances any temperature change as it may occur in one or the other portions of the conduit may lead to a change in phase and that in turn may result in local blocking of the conduit.

FIG. 5 illustrates by way of example such accompanying or companion heating. A tube 38 is provided for the conduction of a fluid but it must be understood that this tube 38 is representative only and could easily be replaced by a bundle of stranded tubes. In any event this conduit or conduit system is looped around by a heating element 39, preferably constructed in accordance with FIG. 4, but in cases constructions of the type shown in FIGS. 1, 2 and 3 can be used. This assembly is jacketed in a heat insulating cover 40 having, for example, a fleece-like configuration or being made of foam. The inner surface of the assembly of jacket 40 may be metallized in order to provide a reflecting surface protecting the tube against heat loss through radiation. Alternatively, a metal foil may be wrapped around the metal assembly 38, 39 before the jacket 40 is provided. The assembly includes, in addition, a mechanically resistive outer jacket 41 made, for example, of polyethylene, polyvinylchloride or the like.

FIG. 6 illustrates a further improvement of heating a conduit or conduit system. The fluid is conducted here through a tube 42 which serves as a core for a stranded assembly which includes the feeder line 43 and 44 as well as additional lines 45. All these lines are stranded around tube 42. The entire stranded assembly is helically looped by means of a heating conductor 46 which makes contact with the respective electrical conductors of the feeder lines in appropriately prepared locations, which are not illustrated, whereby particularly contact is made with the electrical conductors included in the feeder lines 43 and 44. This particular assembly has the significant advantage that the entire surface of the tube is thermally treated in a very uniform manner. There are, moreover, absolutely no restrictions in cutting the endless configuration into the desired lengths. The tube may be made of metal or synthetic. The desired lengths may be cut, for example, at the installation sight, taking the heating element with assembled tube from a supply drum or the like. In order to increase the overall power of a heating system including particularly the supply of connected supplemental heating elements with electric current or to provide brass connections, one or the other or several of the lines 45 will be used for conducting current along the system without contacting the heating wire. These lines will then serve as direct feeder lines in a supplemental heating element connected at a not illustrated location. Alternatively, or in addition, signal, control or monitor lines can be included. A threaded or glass fiber mesh or plate 47 is arranged around the heater line 46 and a thermal insulating cover 48 envelopes the assembly. There may also be a metal or foil or ribbon interposed to establish the reflection for purposes of avoiding radiation heat loss. The entire assembly is jacketed in an outer layer 49 made of an operation-proof synthetic of the type mentioned above.

It should also be mentioned that the multi-conductor assembly of FIG. 6 is readily amenable to a three-phase operation with appropriately staggered points of contact, i.e. insulation spots are removed from the feeder lines, in this case three feeder lines, and these spots are arranged in a star-shaped pattern around the periphery or with respect to the axis of the tube 42. The heating system for tubes is, of course, not limited to a single layer of feeder lines and supplemental lines but plural lines can be provided, separated from each other, through electrically insulating intermediate layers. This way one may even use several separate heating circuits which may serve the purpose of redundancy in order to avoid failure. If a tube in a tube system is to be heated separately from other tubes such individual heating system is, of course, necessary.

The tube 42 is illustrated here as a single conduit but could be interpreted to include a plurality of individual tubes stranded together to obtain a tube bundle; 42 may, however, be even an electrical cable hose or a portion of a tube to be used, for example, as the feeder tube in a dye spraying gun or as a conduit for food transport. Numerous varieties of uses are conceivable.

The heating conductor itself, which is interplaited in the feeder lines or helically looped around or run parallel to these lines is, for example, made of a nickel-chromium alloy. In case a self-limiting feature or automatic control of the heating element is desired it was found advantageous to make the heating conductor of a material having a very high temperature coefficient, for example, pure nickel. The feeder lines and other lines in the case of a ribbon configuration are usually in one plane with the heating or the temperature measuring ribbon. It is of advantage for practicing the invention if the feeder lines are arranged along the respective two edges of the ribbon arrangement, the other lines being disposed in between them. This ensures that the heating wire has available the largest possible area of contact with the respective feeder lines. Of course, the same is true if in addition or in lieu of the heating wire a temperature measuring wire is included in the system.

The heating element illustrated in FIG. 7 includes the two parallel running feeder lines 51 and 52 having conductors 53 which carry a ribbon layer 54 made of polytetrafluoroethylene (PTFE) which was applied first and subsequently sintered in situ. This layer provides electrical insulation. As stated above, polymers of tetrafluoroethylene are to be included which have modifying additives but without rendering the polytetrafluoroethylene thermoplastic. Other materials which can be used here again may include polyimides. The insulation is locally removed at the spots 55, 55', 55" as well as 56, 56' and 56" so that the heating wire which is interwoven or interpleated makes contact at these locations with the conductors 53 of the feeder lines. Therefore, one establishes heating zones of definite power output in between the respective locations 55 and 56, 55' and 56', and 55" and 56". In order to provide the mechanical protection to the heating conductor 57 as well as to physically combine and hold together the feeder lines 51 and 52 a cover made of woven or pleated insulated threads or yarns may be provided or a cover may be extruded around the assembly, for example, made of silicon rubber or a cover may be provided by means of another PTFE ribbon wrapping. The ribbon constructed in accordance with FIG. 7 may instead have elements 57 as a measuring line, for example, for determining local changes in temperature so that the cable or band can be construed as to constitute a monitory device. In this case wire 57 will be a thermal element and the lines 51 and 52 constitute the feeder lines for the thermoelement. The lines 51, 52 may alternatively be stranded together as shown in FIG. 4 and the heating wire 57 may be helically looped around this stranded assembly.

The invention is not limited to the embodiments described above but all changes and modifications thereof, not constituting departures from the spirit and scope of the invention are intended to be include.

I claim:

1. Flexible element for one of the following, heating and temperature measurement, and to be made on a continuous basis so that a desired length can be cut therefrom, comprising, feeder lines each having an electrically conductive core and an electrically insulating layer thereon; and a respective heating conductor being interlooped in interweaving fashion with the feeder lines whereby the heating conductor loops around the feeder lines individually for obtaining a meshlike coherent configuration there being discrete locations of the feeder lines, from which the insulation layer thereof has been removed and making contact with the respective heating or measuring conductor thereat.

2. Device as in claim 1 and including at least one additional supplemental line not making contact with the heating conductor.

3. Device as in claim 2, said feeder and supplemental lines being arranged in one plane next to each other, the heating conductor being arranged to loop back and forth across that plane persuant to the interweaving.

4. Device as in claim 1 wherein the insulation is annularly removed at said location.

5. Device as in claim 1 wherein at least the feeder lines include a temperature resisting insulation on the basis of fluoropolymers.

6. Device as in claim 1 wherein said insulation layers are made of a thermoplastic copolymer of tetrafluoroethylene.

7. Device as in claim 1 using non-thermoplastic fluoropolymers such as polytetrafluoroethylene as insulation layers.

8. Device as in claim 1 and including additional mechanical connections between the heating conductor conductor and the feeder line at the point of contact.

9. Device as in claim 1, and including two feeder lines in contact with the heating conductor, and additional feeder lines for supplemental use.

* * * * *